Aug. 27, 1940.

T. F. LEAHEY 2,212,502

EGG SEPARATOR

Filed Dec. 30, 1938

Inventor
THOMAS F. LEAHEY,

By L. N. Gillis

Attorney

Patented Aug. 27, 1940

2,212,502

UNITED STATES PATENT OFFICE 2,212,502

EGG SEPARATOR

Thomas F. Leahey, Poughkeepsie, N. Y.

Application December 30, 1938, Serial No. 248,607

8 Claims. (Cl. 146—2)

This invention relates to kitchen utensils and has special reference to a device for separating the white from the yolk of an egg, the device being preferably termed an egg separator.

One important object of the invention is to provide an extremely simple and efficient device for separating the white and the yolk of an egg.

A second important object of the invention is to provide a novel device for such purpose wherein there is but a single movable part.

A third important object of the invention is to provide a device of the kind wherein the cost of production is minimized by making the principal parts of the invention of stamped sheet metal.

With the above and other objects in view, the invention consists in general of certain novel details of construction and combinations of parts hereinafter fully described, illustrated in the accompanying drawing and particularly pointed out in the appended claims.

In the accompanying drawing, like characters of reference indicate like parts in the several views, and:

Figure 1:
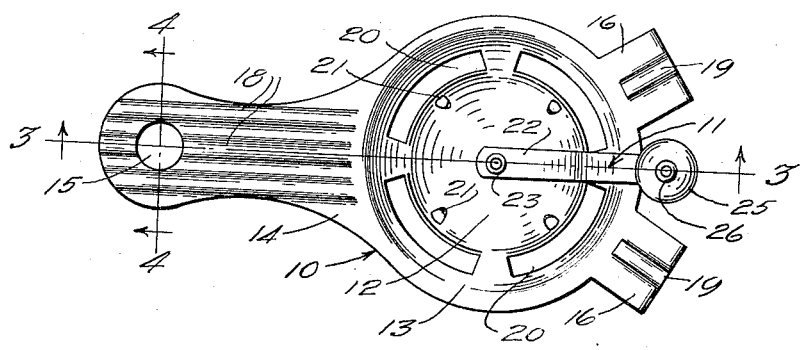
Figure 1 is a plan view of the invention.
Figure 2:
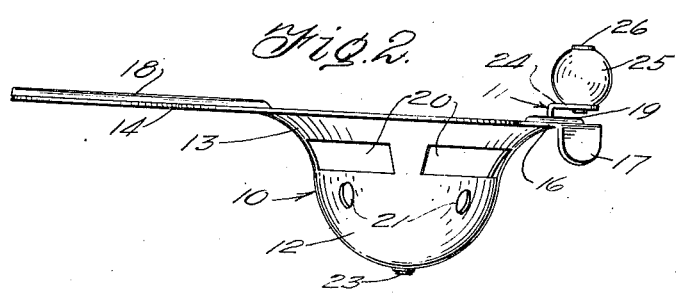
Figure 2 is a side elevation thereof.

The invention consists in general of two parts, the bowl or receptacle 10 and the knife or scraper 11.

The bowl or receptacle 10 comprises a lower part 12 of semi-spherical form and an upper part or lip 13 which flares outwardly from the upper portion of the part 12 in a reversely curved formation. From a portion of the periphery of the lip extends a radial handle 14 provided with an opening 15 by means of which the device may be suspended from a hook or nail. At the opposite part of the lip there is provided a pair of spaced and radially projecting arms 16 having depending flanges 17 at their outer ends. These parts are stamped as a unit from a single blank of thin sheet material, preferably metal, and in order to stiffen the handle 14 and arms 16 the handle is provided with parallel ribs 18 and the arms are provided with ribs 19 stamped from the blank. In the upper part of the bowl there is provided a series of arcuate and circumferentially alined drain slots 20 below each of which is a small drain port 21.

Figure 3:
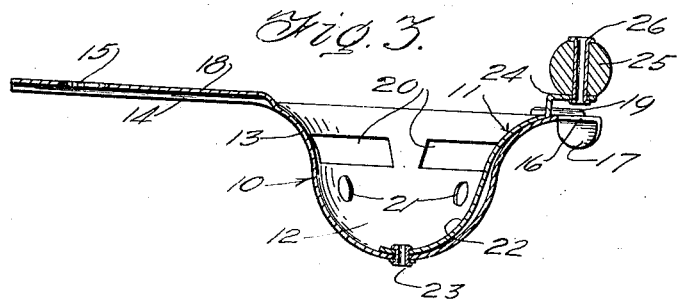
Figure 3 is a section on the line 3—3 of Figure 1.
Figure 4:
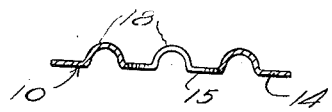
Figure 4 is an enlarged section on the line 4—4 of Figure 1.

The knife or scraper 11 comprises a reversely curved strip 22 of metal or the like substantially conforming to the curvature of the bowl 10. The lower end of this knife is pivotally connected to the bowl 10 by a hollow rivet 23 located at the center of the part 12 to provide a bottom drain opening to insure the complete separation of the white of the egg from the yolk, as shown in Figure 3, the knife portion 22 being located within the bowl 10. At the upper end of the knife 22 there is provided an L-shaped arm 24 which extends upwardly and then outwardly from the upper end of the part 22 and on the outwardly extending portion is mounted a ball handle 25 held by a rivet 26 so that it may revolve with respect to the knife.

In operation an egg is broken in the usual manner so that the yolk remains intact. The separator is placed on a tumbler or other suitable receptacle with the handle 14 and arms 16 resting on the edge of the receptacle and the flanges engaged on the outside. The broken egg then has the contents of the shell dropped in the bowl 10. The knife 11 is then rotated on the pivot 23 which will result in the white of the egg being cut away from the yolk and flowing out of the slots 20 and openings 21 into the receptacle on which the device is placed. The yolk, at the same time, will drop in an unbroken condition to the bottom of the bowl and may be discharged into another receptacle by tilting the device over such receptacle.

It is obvious that changes may be made in the form and proportions of the device and it is not, therefore, desired that the invention should be limited to the exact form herein shown and described but should include all forms covered by the appended claims.

What is claimed, is:

1. An egg separator comprising, a substantially solid bowl provided with a plurality of openings in the upper portion and a central opening in the bottom portion thereof, an elongated member provided with an opening in the end portion thereof, said elongated member being rotatably and centrally mounted on said bowl and having the opening in the end portion thereof in registry with the central opening in the bottom portion of said bowl, and said elongated member fitting within and substantially conforming in shape to the inner surface of said bowl and extending upwardly therefrom.

2. An egg separator comprising, a bowl provided with two rows of circumferentially disposed openings in the upper portion thereof, said bowl further having a centrally disposed opening in the bottom portion thereof, an elongated member having an opening in the end portion thereof, said elongated member being rotatably and centrally mounted on said bowl and having the opening in the end portion thereof in registry with the central opening in the bottom portion of said bowl, a tubular rivet extending through said holes to provide a drain opening, said elongated member fitting within and substantially conforming in shape to the inner surface of said bowl and extending upwardly and outwardly therefrom, and a handle rotatably mounted on the free end portion of said elongated member.

3. An egg separator comprising, a bowl provided with two rows of circumferentially disposed openings in the upper portion thereof, said bowl further having a centrally disposed opening in the bottom portion thereof, an elongated member having an opening in the end portion thereof, said elongated member being rotatably and centrally mounted on said bowl and having the opening in the end portion thereof in registry with the central opening in the bottom portion of said bowl, said elongated member fitting within and substantially conforming in shape to the inner surface of said bowl and extending upwardly and outwardly therefrom, and a handle rotatably mounted on the free end portion of said elongated member.

4. A separator for eggs or the like, comprising, a bowl provided with a plurality of rows of circumferentially aligned openings in the upper portion thereof, a plurality of laterally extending ears integrally extending from the upper portion of said bowl above the said openings, said bowl having a centrally disposed opening in the bottom portion thereof, an elongated member having an opening in the end portion thereof, said elongated member being rotatably and centrally mounted on said bowl and having the opening in the end portion thereof in registry with the central opening in the bottom portion of said bowl, said elongated member fitting within and substantially conforming in shape to the inner surface of said bowl and extending upwardly and outwardly therefrom, and a handle rotatably mounted on the free end portion of said elongated member.

5. An egg separator, or the like, comprising, a bowl provided with a plurality of openings in the upper portion and a central opening in the bottom portion thereof, an elongated arm provided with an opening in the end portion thereof, a hollow pivot pin extending through the opening in the said elongated arm and the central bowl opening to secure the said arm to the bowl for relative rotation therewith, and said elongated arm fitting within and substantially conforming in shape to the inner surface of said bowl and extending upwardly therefrom.

6. An egg separator or the like comprising, a bowl provided with a plurality of openings in the upper portion and a central opening in the bottom portion thereof, an elongated arm provided with an opening in the end portion thereof, a hollow pivot pin extending through the opening in the said elongated arm and the central bowl opening to secure the said arm to the bowl for relative rotation therewith, said elongated arm fitting within and substantially conforming in shape to the inner surface of said bowl and extending upwardly and outwardly therefrom, and a handle rotatably mounted on the free end portion of said elongated arm.

7. A device for separating the white of the egg from the yolk comprising, a substantially solid yolk-shaped bowl provided with a plurality of discharge openings in the upper portion thereof, an elongated knife arm rotatably and centrally mounted on the bottom portion of said bowl and substantially conforming in shape to the inner surface thereof, and said elongated arm being disposed substantially in abutting relation with the inner surface of said bowl and extending upwardly beyond said bowl.

8. An egg separator comprising, a bowl provided with a plurality of openings in the upper portion and a central opening in the bottom portion thereof, an elongated member provided with an opening in the end portion thereof, said elongated member being rotatably and centrally mounted on said bowl and having the opening in the end portion thereof in registry with the central opening in the bottom portion of said bowl, and said elongated member fitting within and substantially conforming in shape to the inner surface of said bowl and extending upwardly therefrom.

THOMAS F. LEAHEY.